(12) United States Patent
Krapf et al.

(10) Patent No.: US 8,639,378 B2
(45) Date of Patent: Jan. 28, 2014

(54) DEVICE SAFETY APPARATUS

(75) Inventors: Reiner Krapf, Reutlingen (DE); Heiko Braun, Leinfelden-Echterdingen (DE); Wolfgang Baierl, Remshalden (DE); Michael Mahler, Leinfelden-Echterdingen (DE); Alexander Werner Hees, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 630 days.

(21) Appl. No.: 12/920,022

(22) PCT Filed: Nov. 12, 2008

(86) PCT No.: PCT/EP2008/065380

§ 371 (c)(1),
(2), (4) Date: Dec. 17, 2010

(87) PCT Pub. No.: WO2009/106164

PCT Pub. Date: Sep. 3, 2009

(65) Prior Publication Data

US 2011/0084885 A1    Apr. 14, 2011

(30) Foreign Application Priority Data

Feb. 29, 2008  (DE) .......................... 10 2008 011 946

(51) Int. Cl.
*G06F 19/00* (2011.01)

(52) U.S. Cl.
USPC .......................................... 700/177; 700/174

(58) Field of Classification Search
USPC ....... 343/720; 700/174, 177; 85/58; 250/221, 250/342; 317/146; 83/63, 72, 76.1, 76.8, 83/73, 364

See application file for complete search history.

(56) References Cited

U.S. PATENT DOCUMENTS

| | | | | |
|---|---|---|---|---|
| 3,953,770 A | * | 4/1976 | Hayashi | 361/179 |
| 5,436,613 A | * | 7/1995 | Ghosh et al. | 340/573.1 |
| 6,959,631 B2 | | 11/2005 | Sako | |
| 6,979,813 B2 | * | 12/2005 | Avril | 250/221 |
| 7,173,537 B2 | | 2/2007 | Voigtlaender | |
| 7,505,620 B2 | | 3/2009 | Braune et al. | |
| 2004/0226800 A1 | | 11/2004 | Pierga et al. | |
| 2005/0207619 A1 | * | 9/2005 | Lohmann | 382/103 |
| 2006/0197020 A1 | * | 9/2006 | Trzecieski et al. | 250/342 |

FOREIGN PATENT DOCUMENTS

| | | |
|---|---|---|
| DE | 4235161 | 5/1993 |
| DE | 10227749 | 1/2004 |
| DE | 60307960 | 5/2007 |
| DE | 10 2006 002 668 | 7/2007 |
| EP | 1 422 022 | 5/2004 |
| EP | 1586805 | 10/2005 |
| WO | WO 9637350 | 11/1996 |
| WO | WO 2004/061361 | 7/2004 |

OTHER PUBLICATIONS

International Search Report, PCT International Patent Application No. PCT/EP2008/065380, dated Feb. 27, 2009.

* cited by examiner

*Primary Examiner* — Hoang V Nguyen (74) *Attorney, Agent, or Firm* — Kenyon & Kenyon LLP (57) ABSTRACT

A device safety apparatus, in particular a hand-held device safety apparatus, having an antenna unit having at least one antenna element, which is provided for the purpose of transmitting and/or receiving a safety signal. The antenna unit has at least one additional component, which in conjunction with the antenna element is provided to specify a safety zone.

16 Claims, 6 Drawing Sheets

DEVICE SAFETY APPARATUS

FIELD OF THE INVENTION

The present invention is based on a device safety apparatus, in particular a safety apparatus for a hand-held tool.

BACKGROUND INFORMATION

A conventional device safety apparatus for a tool machine may have an antenna unit. The antenna unit includes an antenna element, which is provided for the purpose of transmitting and/or receiving a safety signal.

SUMMARY

The present invention relates to a device safety apparatus, in particular a safety apparatus for a hand-held tool for a tool machine, which includes an antenna unit provided with at least one antenna element, which transmits and/or receives a safety signal.

According to an example embodiment of the present invention, the antenna unit includes at least one further component, which defines a safety zone in conjunction with the antenna element.

In this context, "provided" means being specially equipped and/or being especially designed. Furthermore, a "safety zone" in particular denotes a region which may be monitored by the device safety apparatus or with the aid of the antenna unit in that a safety signal is emitted and/or received, and/or the safety zone is disposed in the region around a danger source, particularly a tool area, and/or around a tool, for the protection of an operator.

Furthermore, the "specification of a safety zone" in particular is meant to denote a process by which a region is able to be defined or set up by transmitting and/or receiving the safety signal from the antenna unit or the antenna element.

A "further component" in particular denotes a component which is provided for transmitting and/or receiving a safety signal, and/or for at least partially reflecting the safety signal emitted by the antenna element, and/or for at least partially deflecting the safety signal, in particular refracting and/or focusing the safety signal of the antenna element.

The safety signal of the antenna unit may preferably be a high-frequency signal, in particular a high-frequency radar signal, such as an ultra-wide band signal, an ultra-wide band signal (UWB signal) denoting an electromagnetic signal, in particular, which has a fundamental frequency range featuring a medium frequency in a frequency range of 1 GHz to 15 GHz and a frequency band width of at least 500 MHz.

Because of the design according to the example embodiment of the present invention, a safety zone for the device safety apparatus, especially around a tool, or in a tool area of a hand-held tool, is able to be specified for the protection of an operator in a cost-effective and simple manner in terms of design. In particular, a cost-effective antenna element having a large transmission and/or receiving angle of the safety signal may be used for this purpose, and a safety zone, which covers a region that preferably is smaller than an emission range of the antenna element, is specified in conjunction with the additional component.

In an advantageous manner, the example device safety apparatus is provided for the detection of human and/or animal tissue, so that a particularly advantageous protection of the operator from injuries may be achieved, in particular injuries caused by a tool and/or by other sources of danger monitored via the safety zone. Furthermore, additional parameters, such as a material thickness of an object to be processed, and/or a speed, especially a motion of the device and/or a motion of the tool, etc. are able to be detected inside the safety zone with the aid of the antenna unit.

The example device safety apparatus is advantageously provided to protect the operator of hand-held tools, such as hand-held tools that are driven pneumatically and/or mechanically, and/or, in an especially advantageous manner, electrically. However, the device according to the example embodiment of the present invention is not restricted to hand-held tools and may in particular also be used for stationary tools, such as bench-top saws, for example.

In an especially advantageous manner, the example device, in particular a hand-held device, may be designed to operate in conjunction with the device safety apparatus and switch off at least one operating mode for the tool when the antenna unit detects human tissue and/or animal tissue inside the safety zone. Preferably, the device safety apparatus may be used for hand-held electric devices, especially hand-held tool machines, and/or for electrically driven cutting devices intended for household use and provided with a cutting tool or a separating tool, e.g., a piercing saw, a hand-held circular saw, hedge clippers, a motor saw, an abrasive cutting machine, a lawnmower, a shredder, a hand mixer, an electric knife, etc. The device safety apparatus is advantageously part of the hand-held device and integrated therein. However, the device according to the present invention is not restricted to hand-held devices and in particular may also be used for stationary tools, such as bench-top saws, for example.

Furthermore, it is provided that the antenna element and the further component are set up to restrict the safety zone at least partially, thereby making it possible to restrict the safety zone at an advantageous distance, in particular a uniform distance, in at least one direction, preferably around a tool and/or a further danger source, e.g., a uniform safety zone along a tool formed by a cutting tool. In this context, "to restrict the safety zone" in particular denotes a process that restricts a safety zone to a region around a danger zone, especially around a tool, and/or a safety zone that is restricted to a smaller region than an emission range and/or receiving range of the antenna element in cooperation between the further component and the antenna element.

In an especially advantageous manner, the example device safety apparatus has a control unit, which is situated within the safety device and detects human tissue with the aid of a signal sensed by the antenna element and/or the additional component. A "control unit" in particular is meant to denote a unit which may be realized by a computer unit, an evaluation unit, a control unit and/or regulation unit, the control unit possibly being formed by the processor itself and also, in particular, a processor and additional electronics components, such as storage means. A high level of protection for an operator during operation of a hand-held tool, especially a hand-held electric tool, is able to be achieved in conjunction with the device safety apparatus, and a risk of injury of the operator posed by a tool, in particular, is able to be at least reduced. The control unit is preferably for activation of a protective function, e.g., the switch-off of a motor of the device, and/or an activation of a stand-still mode for a tool of the device, and/or an output of an acoustic and/or optical signal for the operator, and/or additional protective functions one skilled in the art would consider useful, so that an injury of the operator is at least partially prevented.

If the at least one additional component is an antenna element, a safety zone around a tool is able to be detected in an especially advantageous and constructively simple manner.

Furthermore, each of the two antenna elements has at least one detection range, which partially form an overlap region, thus making it possible achieve an especially high level of safety in the shared overlap region via the detection by the at least two antenna elements, the implementation not posing any challenges from the design aspect. In this context, an "overlap region" in particular is to denote a region formed by the detection ranges of the individual antenna elements and is made up of overlapping or intersecting sub-regions of the individual detection ranges of the antenna elements.

Furthermore, if the overlap region is formed by the safety zone, it is possible to restrict the safety zone with the aid of the at least two antenna elements, especially to a region around a danger source such as a tool, in an uncomplicated manner in terms of design; in addition, advantageous monitoring of the safety zone is able to be achieved with the aid of the at least two antenna elements of the antenna unit.

Furthermore, the device safety apparatus includes at least one control unit, which is provided to detect the overlap region of the at least two antenna elements. The design according to the present invention provides better protection of an operator because the control unit is able to evaluate and acquire the data detected by the antenna unit in an especially speedy manner, so that human tissue and/or animal tissue is able to be detected in a particularly rapid manner.

In a further development of the present invention, the at least one further component is a reflector element, which advantageously makes it possible to define or restrict the protective zone by reflecting a safety signal emitted by the antenna element, and/or to calibrate the safety zone with the aid of the reflector element. The antenna element preferably includes the reflector element together with at least two antenna elements, so that the safety zone is able to be achieved by deflecting or reflecting a safety signal from a first antenna element to a second antenna element. In this context, a "reflector element" in particular denotes an element that preferably is a passive element and provided for the purpose of reflecting and/or deflecting at least one safety signal emitted by an antenna element. Furthermore, the reflector element may also be disposed on the hand-held device safety apparatus in a removable manner; thus, an operator-desired enlargement of the protection range delimited with the aid of the reflector element, to at least partially a detection range of the antenna element and/or an overlap region of detection ranges of a plurality of antenna elements is able to be achieved. The reflector element is preferably made of metal.

Furthermore, it is provided that the reflector element and the at least one antenna element are disposed in diametrically opposed end regions of the safety zone, so that the safety zone is able to be restricted in an uncomplicated manner in terms of design by deflecting the safety signal, emitted by a first antenna element via the reflector element, to a further antenna element, the reflector element marking an end of the safety zone along one direction, in particular. Preferably a danger zone, especially a tool area of the hand-held device, is disposed between the at least one antenna element and the reflector element.

An especially rapid detection of the reflector element within the device safety apparatus is achievable if the device safety apparatus has a control unit provided for the purpose of detecting the reflector element and/or for detecting a signal reflected by the reflector element.

Furthermore, it is provided that the at least one further component is realized by a dielectric element. In this context, a "dielectric element" in particular is to denote an element which is made of a dielectric material and preferably has a high proportion of polarizable molecules. The dielectric element is preferably provided for the purpose of deflecting at least one safety signal emitted by an antenna element and/or for refracting and/or focusing at least one electromagnetic wave emitted by the antenna element, or at least the safety signal. Because of the design according to the present invention, the signal radiated by the at least one antenna element is able to be restricted to a safety zone in a simple manner in terms of design. In this context it is also possible to use one antenna element for different types of hand-held tools, in that a device-specific orientation or restriction of the safety signal, emitted by the antenna element, to the safety zone is able to be achieved in an especially cost-effective manner. In addition, the hand-held device safety apparatus may include a plurality of components, each being implemented by a dielectric element, which advantageously are combinable into a dielectric unit, and which are provided to specify or delimit the safety zone in conjunction with the antenna element.

Furthermore, it is provided that the dielectric element is at least partly disposed along a signal path of a safety signal between the at least one antenna element and the safety zone, thereby making it possible to delimit the safety zone in a simple manner in terms of design. In addition, a compact, in particular space-saving antenna unit is able to be realized. This may be achieved in a particularly advantageous manner if the dielectric element is implemented in the form of a dielectric lens.

Furthermore, it is provided that the antenna element includes at least one protective cover, so that the antenna unit, especially the at least one antenna element and a further component, especially a dielectric element, are advantageously able to be protected from undesired contamination. The protective cover may be implemented separately from a housing of a hand-held tool or it may be implemented in an especially advantageous manner by a sub-region of the housing of the hand-held tool, thereby saving space as well as components.

BRIEF DESCRIPTION OF THE DRAWINGS

Further advantages are derived from the description of the figures below. The figures show exemplary embodiments of the present invention. The figures and the description below include numerous features in combination. One skilled in the art will necessarily consider the features also individually and combine them into useful further combinations.

DETAILED DESCRIPTION OF EXAMPLE EMBODIMENTS

Figure 1:
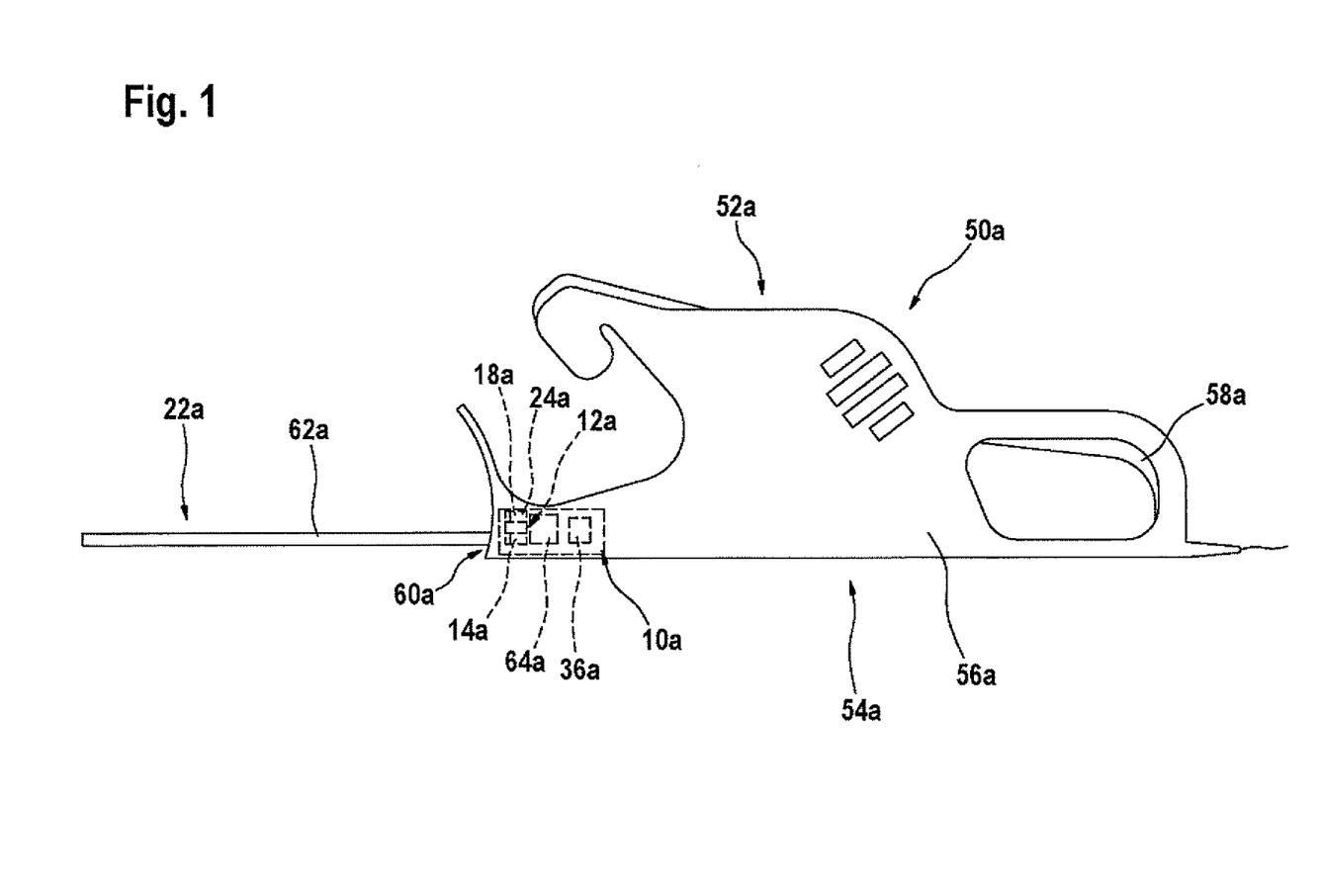
FIG. 1 shows a schematic illustration of a hand-held device formed by an electric tool, the device having a device safety apparatus according to an example embodiment of the present invention.

FIG. 1 shows a hand-held device 50a formed by a hand-held electric device 52a. Hand-held electric device 52a is a hand-held tool machine 54a, which in turn is implemented in the form of hedge clippers. Hand-held tool machine 54a has a housing 56a including a main handle 58a, which is provided for an operator in order to guide hand-held tool machine 54a and/or to transmit force from the operator to hand-held tool machine 54a. In addition, hand-held tool machine 54a has a tool receptacle 60a, in which a tool 62a implemented in the form of a cutting tool is disposed. To protect the operator from injury by the cutting tool while hand-held tool machine 54a is in operation, hand-held tool machine 54a is provided with a device safety apparatus. The device safety apparatus, which is realized as hand-held device safety apparatus 10a, is situated inside hand-held tool machine 54a and surrounded by housing 56a of hand-held tool machine 54a.

Figure 2:
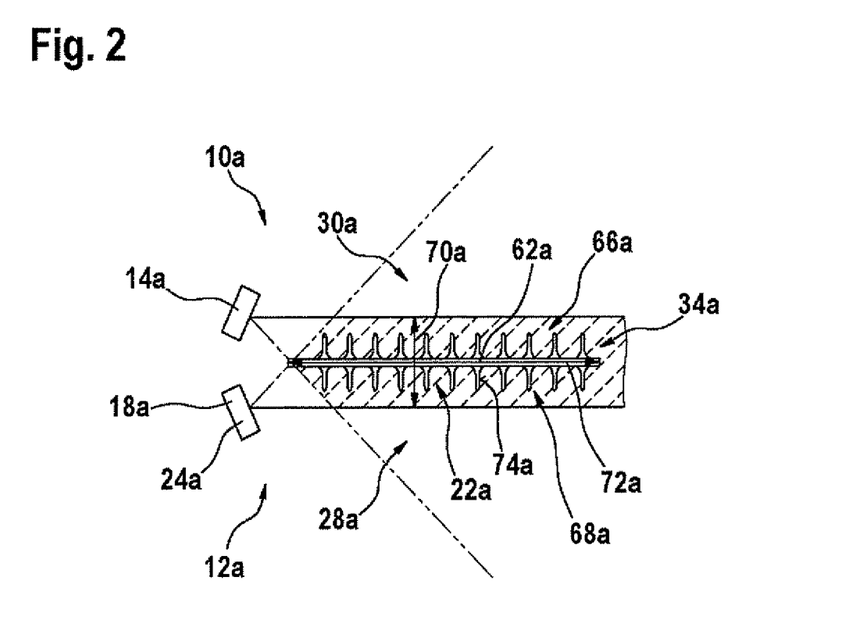
FIG. 2 shows a schematic representation of an antenna unit of the example device safety apparatus including an antenna element and a further component.

Hand-held device safety apparatus 10a has an antenna unit 12a, which includes an antenna element 14a and a further component 18a, which is formed by an antenna element 24a and is provided jointly with antenna element 14a in order to define a safety zone 22a (cf. FIGS. 1 and 2). For illustration purposes, safety zone 22a is shown as hatched region in FIG. 2. Both antenna elements 14a, 24a are provided for emitting and receiving a safety signal while hand-held tool machine 54a is in operation. With the aid of the safety signals emitted and received by the two antenna elements 14a, 24a, safety zone 22a is defined during operation of hand-held tool machine 54a or hand-held device safety apparatus 10a. The safety signals from both antenna elements 14a, 24a are formed by a high-frequency radar signal formed by an ultra-wide band signal. The ultra-wide band signal is generated by an ultra-wide band unit 64a, which is connected to antenna unit 12a via a data line (not illustrated). For analyzing and/or evaluating the safety signals emitted and received by antenna unit 12a or the two antenna elements 14a, 24a, hand-held device safety apparatus 10a also includes a control unit 36a.

FIG. 2 shows a system which is made up of antenna unit 12a having antenna element 14a and additional component 18a or antenna element 24a, in greater detail. Both antenna elements 14a, 24a are provided for restricting safety zone 22a around the cutting tool while hand-held tool machine 54a is in operation. For this purpose the two antenna elements 14a, 24a each have their own conical detection range 28a, 30a, which gets larger as the distance to individual antenna elements 14a, 24a increases. The two detection ranges 28a, 30a of the two antenna elements 14a, 24a each have a sub-region 66a, 68a, the two detection ranges 28a, 30a being disposed in overlapping or intersecting manner in the two subregions 66a, 68a. A shared overlap region 34a is formed by safety zone 22a. An orientation of the two antenna elements 14a, 24a or the two detection ranges 28a, 30a of antenna elements 14a, 24a is mutually adapted and adapted to the cutting tool of hand-held tool machine 54a, in that shared overlap region 34a of the two antenna elements 14a, 24a, i.e., safety zone 22a, marks a region around the cutting tool having a generally constant width 70a along a main extension direction 72a of the cutting tool. In addition, safety zone 22a is aligned parallel to main extension direction 72a of the cutting tool. Objects, in particular human tissue, within safety zone 22a, such as a hand of the operator, and/or animal tissue, are thus detected by the two antenna elements 14a, 24a, and detected data or the sensed signals of antenna elements 14a, 24a are transmitted to control unit 36a, where a detection of the human tissue and/or animal tissue within safety zone 22a is performed by evaluating the data. In addition, a differentiation between human or animal tissue and a workpiece or an object to be processed is able to take place inside control unit 36a. In the event that human tissue and/or animal tissue has been detected within protective zone 22a and identified by control unit 36a, such as a hand or the leg of an operator, a safety function is additionally activated by control unit 36a, such as a switch-off and/or change in an operating mode of the sawing tool and/or blocking of the sawing tool and/or an output of an optical and/or acoustic signal to the operator via an optical and/or acoustic output unit of hand-held device safety apparatus 10a or electric device 52a, and/or further safety functions that are considered useful.

Overlap region 34a of the two antenna elements 14a, 24a, or safety zone 22a around the cutting tool, also extends through a workpiece to be processed, such as a branch of a hedge, so that effective protection along a main extension direction 72a of the cutting tool or along an entire length of a cutting edge 74a of the cutting tool is achieved for an operator of hand-held tool machine 54a. Furthermore, hand-held device safety apparatus 10a is designed to determine a speed of the cutting tool and/or a speed of hand-held tool machine 54a using the two antenna elements 14a, 24a, in that control unit 36a calculates the speed based on the safety signals detected by antenna elements 14a, 24a and transmitted to control unit 36a. Information about the speed of the cutting tool and/or hand-held tool machine 54a is able to be transmitted to an operator via an optical and/or acoustic output unit of hand-tool safety apparatus 10a and/or hand-held tool machine 54a.

FIGS. 3 through 9 show alternative exemplary embodiments. Components, features and functionalities that generally remain unchanged are basically numbered using the same reference symbols. However, in order to distinguish the exemplary embodiments, letters a through g have been added to the reference symbols of the exemplary embodiments. The following description is generally restricted to the differences from the exemplary embodiment in FIGS. 1 and 2, reference being made to the description of the exemplary embodiment in FIGS. 1 and 2 with respect to components, features and functionalities that remain the same.

Figure 3:
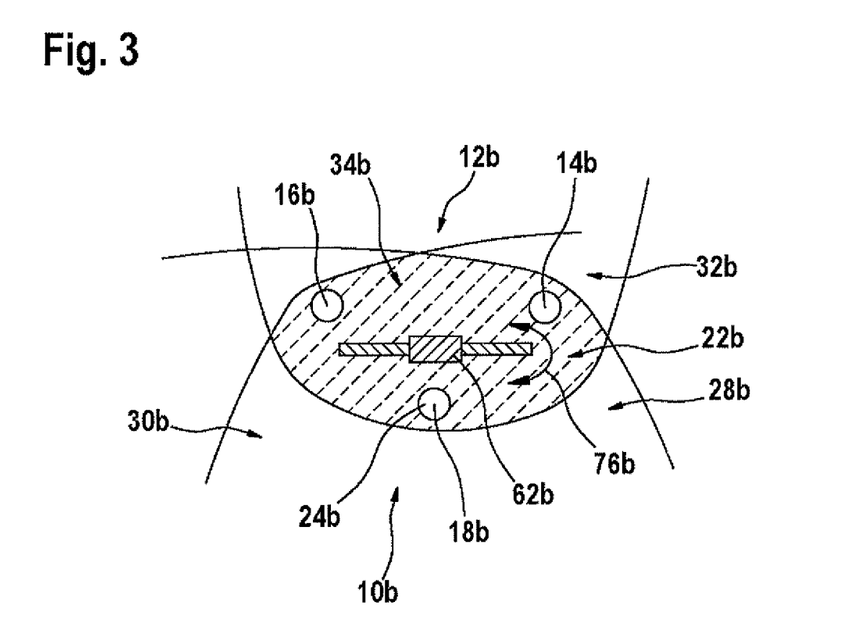
FIG. 3 shows a schematic representation of a development of an antenna unit as an alternative to the antenna unit shown in FIG. 2, the antenna unit having two antenna elements and a further component.

As an alternative to the development in FIG. 2, FIG. 3 shows a development of an antenna unit 12b of a hand-held device safety apparatus 10b for a hand-held device formed by a hand-held tool machine. Antenna unit 12b has two antenna elements 14b, 16b and a further component 18b, which likewise is formed by an antenna element 24b. The three antenna elements 14b, 16b, 24b are provided to delimit a safety zone 22b (shown as hatched region, analogous to FIG. 2) around a tool 62b of the hand-held tool machine formed by a cutting tool. For this purpose, the three antenna elements 14b, 16b, 24b point in a circumferential direction 76b, which is disposed generally perpendicular to a main-extension direction of the cutting tool, and are situated around the cutting tool at a from each other. Safety zone 22b, which is formed by a shared overlap region 34b of detection ranges 28b, 30b, 32b of three antenna elements 14b, 16b, 24b, is formed by a region around the cutting tool that is generally completely covered in circumferential direction 76b. This forms a safety zone 22b around the cutting tool, which is covered by the cutting tool when viewed by an operator from the direction of a hand-held tool machine implemented in the form of hedge clippers.

Figure 4:
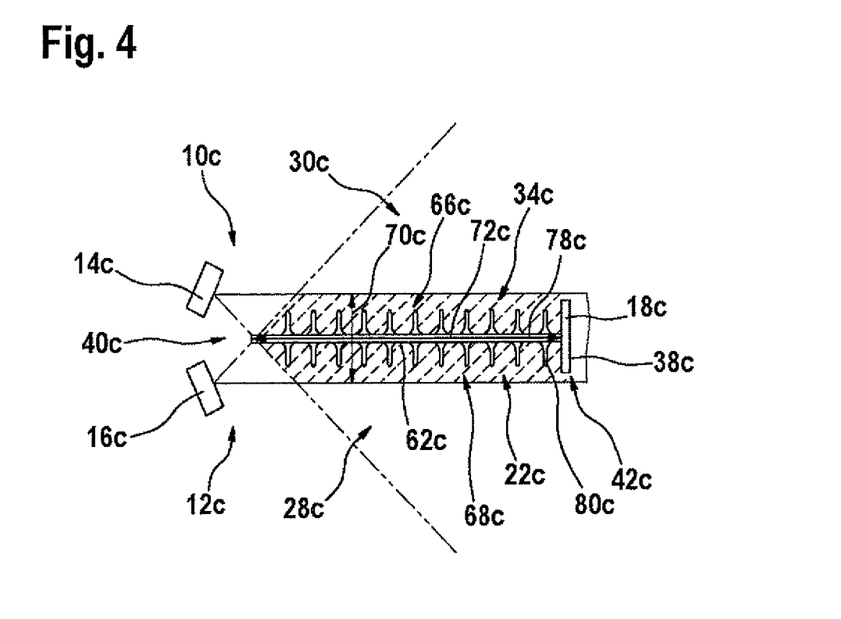
FIG. 4 shows a schematic representation of an alternative development of an antenna unit having a reflector element.

FIG. 4 shows a development of a hand-held device safety apparatus 10c as an alternative to the development in FIGS. 1 through 3. Hand-held device safety apparatus 10c has an antenna unit 12c having two antenna elements 14c, 16c. Analogous to the description of FIG. 2, both antenna elements 14c, 16c are provided for the purpose of specifying or delimiting a safety zone 22c (shown as hatched region analogous to FIG. 2); safety zone 22c has a virtually uniform width 70c along a main extension direction 72c of a tool 62c, formed by a cutting tool, of a hand-held device in the form of a hand-held electric tool. Safety zone 22c is formed by a shared overlap region 34c, which is made up of overlapping subregions 66c, 68c of detection ranges 28c, 30c of individual antenna elements 14c, 16c. In order to define or delimit safety zone 22c in main-extension direction 72c of the cutting tool, antenna unit 12c includes a further component 18c, which is formed by a reflector element 38c. Along main-extension direction 72c of the cutting tool, antenna elements 14c, 16c and reflector element 38c are situated at opposite end areas 40c, 42c of safety zone 22c. Reflector element 38c is disposed in an end area 42c of the cutting tool facing away from the hand-held tool machine or from antenna elements 14c, 16c. Furthermore, reflector element 38c is disposed in symmetry with a tool segment 78c of the cutting tool, which extends in main-extension direction 72c, from which direction cutting teeth 80c extend in an outward direction on both sides, perpendicular to main-extension direction 72c. Also, it is basically possible to realize the cutting tool and reflector element 38c in one piece. Furthermore, in another development of the present invention, it is also possible for antenna unit 12c to include a plurality of reflector elements 38c.

While the hand-held tool machine or hand-held device safety apparatus 10c is being operated, reflector element 38c reflects safety signals emitted by the two antenna elements 14c, 16c, so that reflector element 38c is detected on the basis of the safety signals detected by the two antenna elements 14c, 16c. For this purpose, hand-held device safety apparatus 10c includes a control unit, analogous to the description of FIG. 1, which is not shown further in FIG. 4 and which is provided for evaluating the data of the safety signals detected by the two antenna elements 14c, 16c. Reflector element 38c is detected or safety zone 22c is defined inside the control unit while hand-held device safety apparatus 10c is in operation. In this context, safety zone 22c is restricted in the control unit to the safety signals received by antenna elements 14c, 16c, which were emitted by antenna elements 14c, 16c and reflected by reflector element 38c to antenna elements 14c, 16c, so that safety zone 22c is restricted along a main-extension direction 72c of the cutting tool by a reflection of the safety signals emitted by antenna elements 14c, 16c by reflector element 38c.

Figure 5:
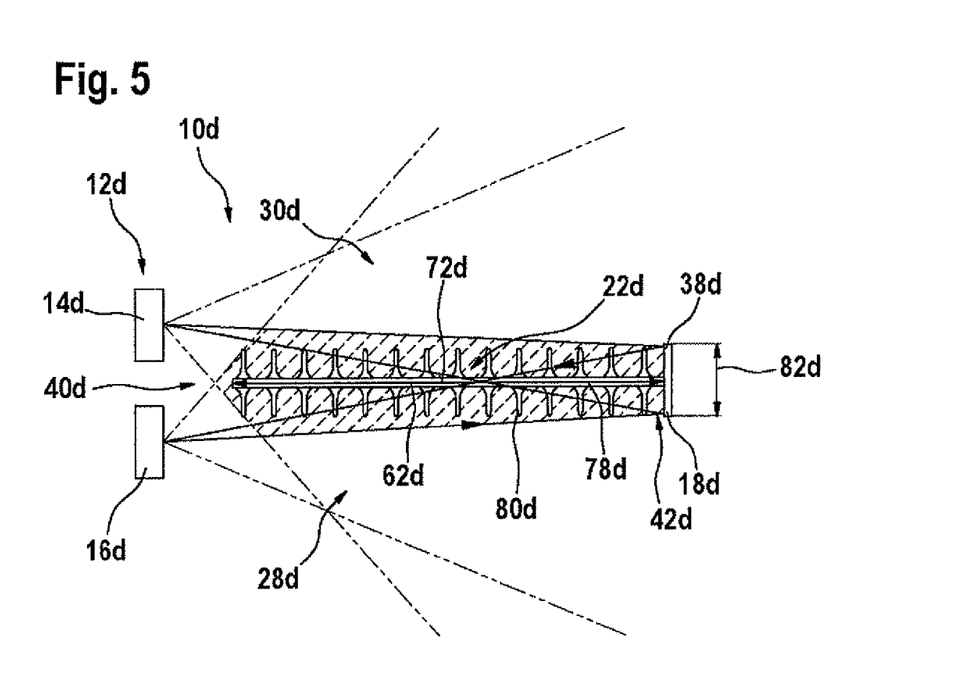
FIG. 5 shows a schematic illustration of a representation of an antenna unit, as an alternative development to that in FIG. 4, having a reflector element for deflecting a safety signal.

FIG. 5 shows a development of an antenna unit 12d of a hand-held device safety apparatus 10d, which is an alternative development to the one shown in FIG. 4. A safety zone 22d (shown as hatched region, analogous to FIG. 2) around a tool 62d, formed by a cutting tool, of a hand-held tool machine is defined by antenna unit 12d, which includes two antenna elements 14d, 16d for this purpose as well as an additional component 18d, which is formed by a reflector element 38d. Reflector element 38d is disposed in an end area 42d of the cutting tool facing away from the hand-held tool machine or antenna elements 14d, 16d. In conjunction with the two antenna elements 14d, 16d, reflector element 38d delimits safety zone 22d in that a safety signal, emitted by first antenna element 14d, is reflected or deflected by reflector element 38d to second antenna element 16d, or in that a safety signal, emitted by second antenna element 16d, is reflected or deflected by reflector element 38d to first antenna element 14d. The two safety signals emitted by the two antenna elements 14d, 16d preferably differ with respect to a frequency and/or additional signal properties considered useful. Safety zone 22d is a function of a placement of the two antenna elements 14d, 16d and a length 82d of reflector element 38d, which is aligned generally perpendicular to a main-extension direction 72d of the cutting tool. The placement of reflector element 38d, and a data evaluation of the safety signals detected by antenna elements 14d, 16d with the aid of a control unit are carried out in a manner that is similar to the manner described in connection with FIG. 4.

Figure 6:
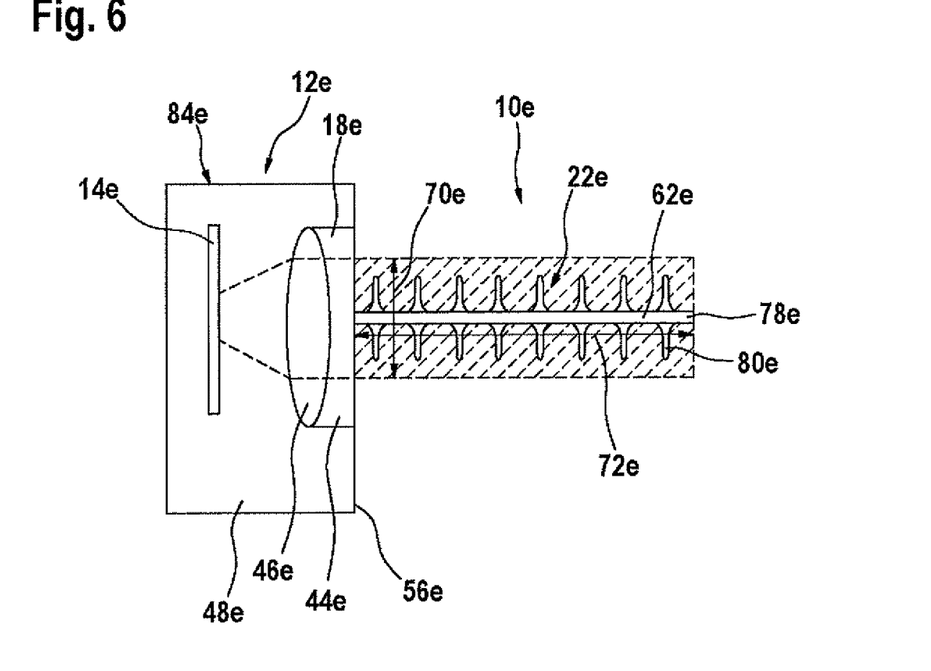
FIG. 6 shows a schematic representation of an alternative development of an antenna unit having a dielectric lens.

FIG. 6 shows a development of an antenna unit 12e that is an alternative to the antenna unit in FIGS. 2 through 5, and is provided for a hand-held device safety apparatus 10e for a hand-held device formed by a hand-held tool machine. Antenna unit 12e has an antenna element 14e and a further component 18e for this purpose, which are jointly provided to specify or delimit a safety zone 22e (shown as hatched region analogous to FIG. 2) around a tool 62e formed by a cutting tool. Further component 18e is a dielectric element 44e implemented in the form of a dielectric lens 46e, which is disposed within a signal path or a signal propagation course of a safety signal, emitted by antenna unit 12e or antenna element 14e, between antenna unit 12e or antenna element 14e and the cutting tool. With the aid of dielectric lens 46e, the conically propagating safety signal is refracted and converted or focused into a safety signal that is generally propagating parallel to a main-extension direction 72e of the cutting tool. In so doing, safety zone 22e around the cutting tool is delimited, safety zone 22e having a generally uniform width 70e along main-extension direction 72e of the cutting tool and extending parallel to the cutting tool or main-extension direction 72e. To protect antenna unit 12e from contamination, hand-held device safety apparatus 10e has a protective cover 48e, which is formed by a sub-region 84e of a housing 56e of the hand-held tool machine.

Figure 7:
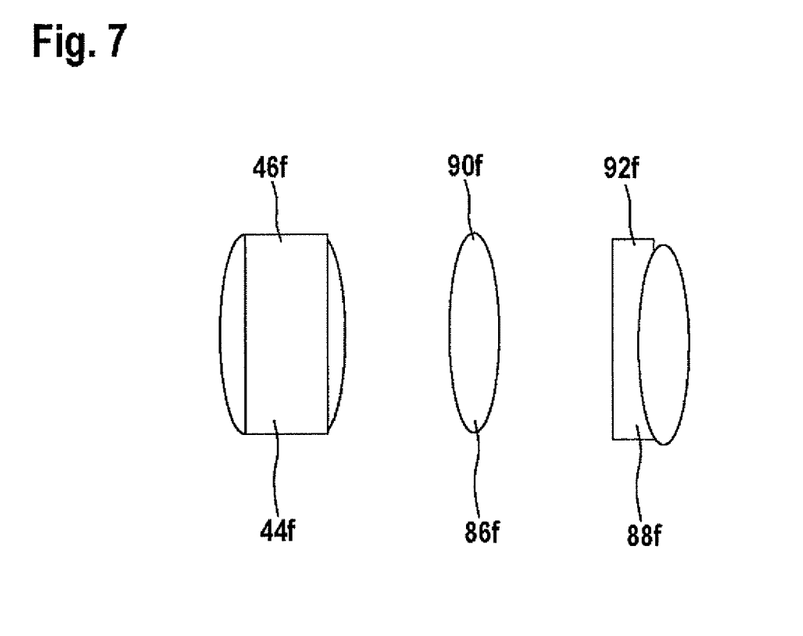
FIG. 7 shows a schematic representation of further dielectric elements of the antenna unit.

FIG. 7 shows dielectric elements 44f, 86f, 88f as alternatives to those in FIG. 6, which dielectric elements are formed by a dielectric lens 46f, 90f, 92f. In a further development of the present invention, it is conceivable to dispose dielectric lenses 46f, 90f, 92f inside an antenna unit; depending on the development of a safety zone around a tool, they may be disposed within a signal path or a signal propagation course of a safety signal between the antenna unit and the tool. In addition, it is also possible to combine a plurality of these dielectric lenses 46f, 90f, 92f and/or additional dielectric elements (not shown further in FIGS. 6 and 7) into a dielectric unit and to place them within the beam path of the safety signal emitted by the antenna unit, and/or to combine them with a reflector element (cf. FIGS. 4 and 5).

Figure 8:
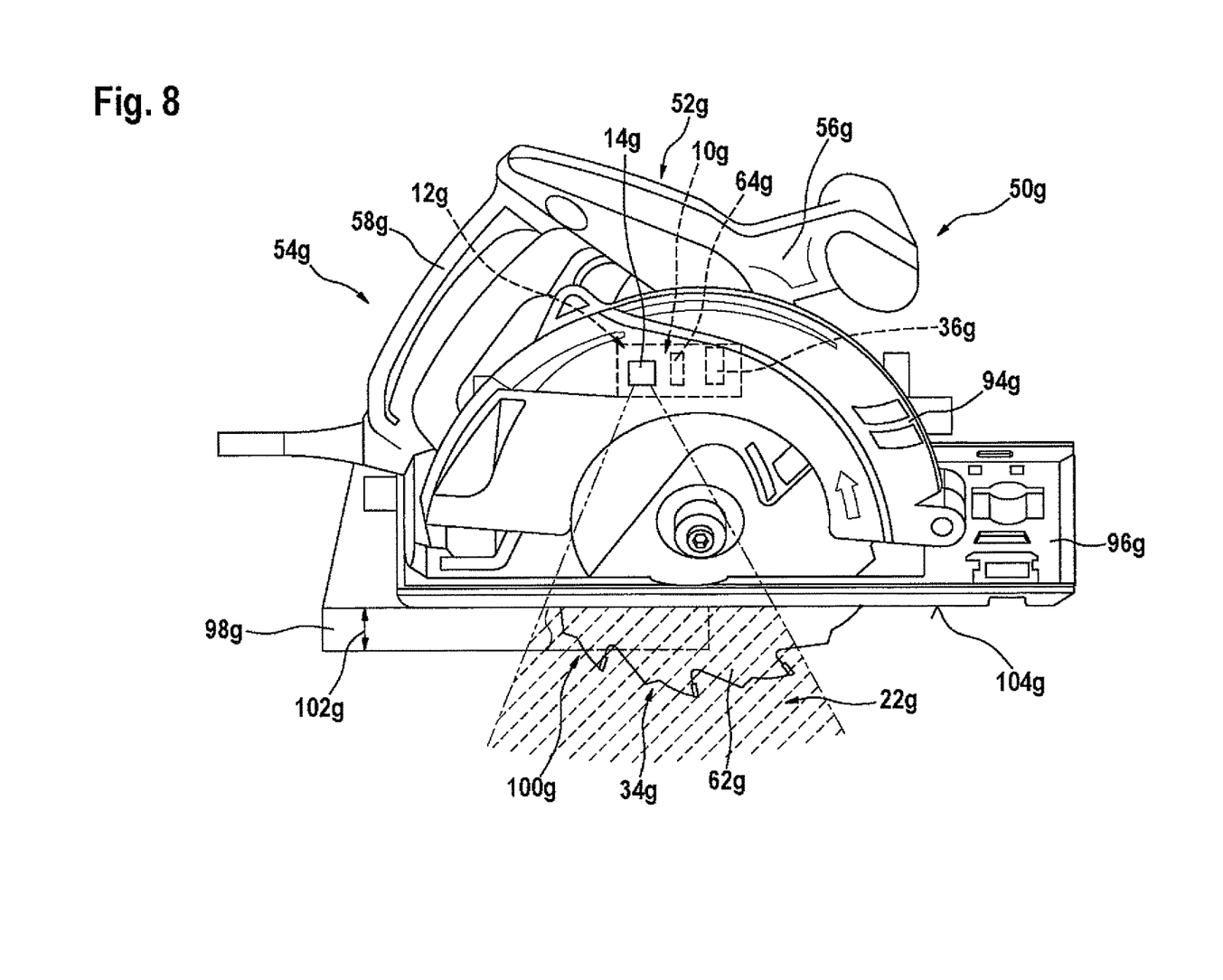
FIG. 8 shows a schematic representation of a hand-held device, as an alternative to that shown in FIG. 1, the device being formed by an electric tool having a device safety apparatus according to the present invention.
Figure 9:
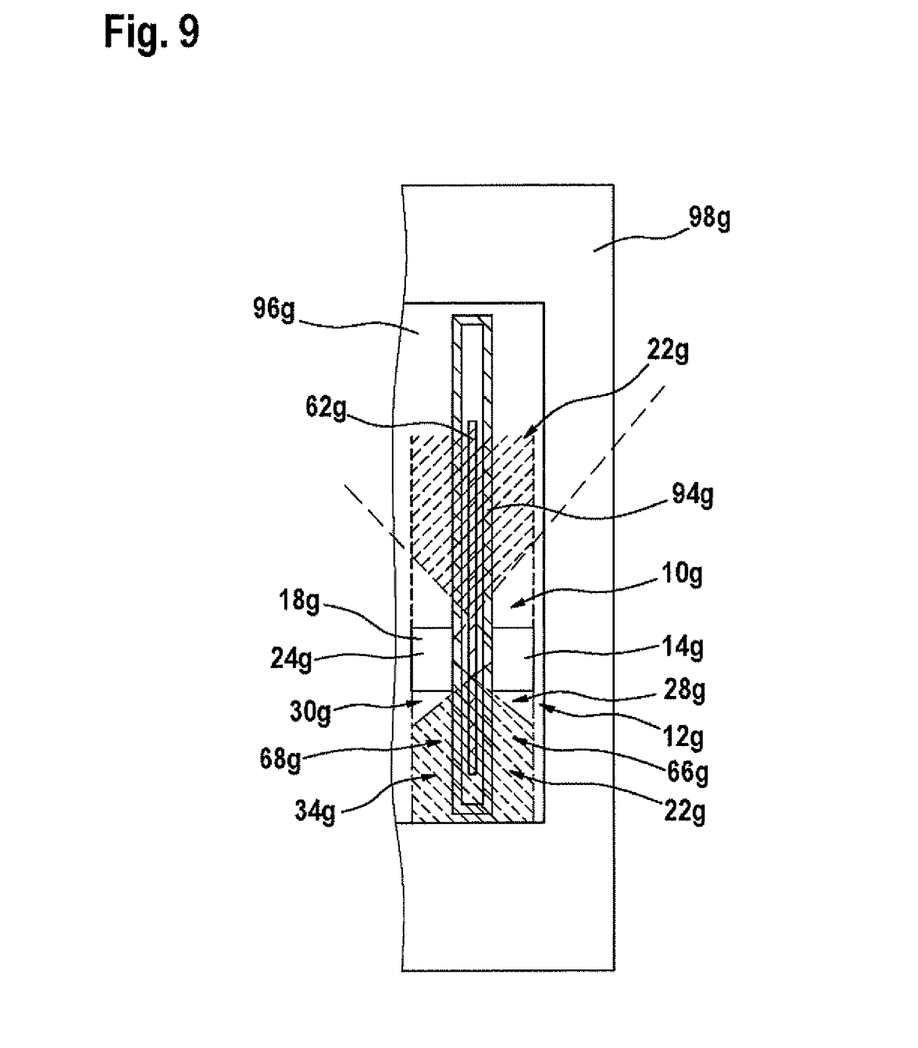
FIG. 9 shows a schematic representation of the device safety apparatus from FIG. 8, having an antenna unit, in a view from above.

FIGS. 8 and 9 show a development of a hand-held device 50g as an alternative to the device in FIG. 1. Hand-held device 50g is formed by a hand-held electric device 52g, which is a hand-held circular saw. Hand-held electric device 52g, i.e., the hand-held circular saw, has a protective cover 94g for a tool 62g formed by a sawing tool, which is implemented in the form of a disk-shaped circular saw blade, and it has a sliding plate 96g, with whose aid the hand-held circular saw is sliding or moving on a workpiece 98c to be processed during operation. Furthermore, hand-held circular saw has a hand-held device safety apparatus 10g including an antenna unit 12g, antenna unit 12g being disposed on protective cover 94g, as shown in FIG. 8 and FIG. 9 in a view from above. Antenna unit 12g has an antenna element 14g and a further component 18g, which is likewise formed by an antenna element 24g. With the aid of the two antenna elements 14g, 24g, a safety zone 22g (shown as hatched region, analogous to FIG. 2) is specified or delimited around a danger zone 100g of the sawing tool, danger zone 100g being formed by a contact region or a potential contact region of the sawing tool and a workpiece 98g to be processed, and a region of the sawing tool that is disposed on a side 104g of sliding plate 96g facing away from protective cover 94g. Safety zone 22g is formed by a shared overlap region 34g in this case. Overlap region 34g is formed by overlapping or intersecting sub-regions 66g, 68g of detection ranges 28g, 30g of the two antenna elements 14g, 24g, analogous to the description in connection with FIG. 2. In order to cover this danger zone 100g virtually in its entirety by protection region 22g formed by the two antenna elements 14g, 24g, the safety signals emitted and received by the two antenna elements 14g, 24g are provided in order to specify and delimit safety zone 22g through sliding plate 96g and workpiece 98g. Furthermore, using the safety signals emitted and received by the two antenna elements 14g, 24g, a thickness 102g of workpiece 98g is able to be determined, which may be output to an operator via an output unit (not shown further) of hand-held device apparatus 10g and/or the circular saw.

What is claimed is:

1. A device safety apparatus for a hand-held device, comprising:
an antenna unit having at least one first antenna element adapted to at least one of transmit and receive a safety signal, and at least one additional component which in conjunction with the first antenna element specifies a safety zone;
wherein the safety signal of the antenna unit is a high-frequency radar signal having a frequency range between 1 GHz and 15 GHz.

2. The device safety apparatus as recited in claim 1, wherein the first antenna element and the further component are provided to at least partially delimit the safety zone.

3. A device safety apparatus as recited in claim 1, further comprising:
a control unit adapted to detect human tissue within the safety zone based on a signal sensed by at least one of the first antenna element and the additional component.

4. The device safety apparatus as recited in claim 3, wherein the control unit is adapted to activate a protective function.

5. The device safety apparatus as recited in claim 1, wherein the at least one further component is formed by a second antenna element.

6. The device safety apparatus as recited in claim 5, wherein the at least one antenna element and the second antenna element have at least one detection range in each case, which at least partially have a common overlap region.

7. The device safety apparatus as recited in claim 6, wherein the overlap region is formed by the safety zone.

8. The device safety apparatus as recited in claim 6, further comprising:
a control unit adapted to detect the overlap region of the at least one antenna element and the second antenna element.

9. The device safety apparatus as recited in claim 1, wherein the at least one further component is formed by a reflector element.

10. The device safety apparatus as recited in claim 9, wherein the reflector element and the at least one antenna element are disposed at opposite end areas of the safety zone.

11. The device safety apparatus as recited in claim 9, further comprising:
a control unit to detect at least one of the reflector element and a signal reflected by the reflector element.

12. The device safety apparatus as recited in claim 1, wherein the antenna unit includes at least one protective cover.

13. A device safety apparatus for a hand-held device, comprising:
an antenna unit having at least one first antenna element adapted to at least one of transmit and receive a safety signal and at least one additional component which in conjunction with the first antenna element specifies a safety zone;
wherein the at least one further component includes a dielectric element.

14. The device safety apparatus as recited in claim 13, wherein the dielectric element is at least partially disposed along a signal path of the safety signal between the at least one antenna element and the safety zone.

15. The device safety apparatus as recited in claim 13, wherein the dielectric element is at least partially formed by a dielectric lens.

16. A hand-held tool device having a device safety apparatus, the device safety apparatus including an antenna unit having at least one antenna element adapted to at least one of transmit and receive a safety signal, and at least one additional component which in conjunction with the antenna element specifies a safety zone;
wherein the safety signal of the antenna unit is a high-frequency radar signal having a frequency range between 1 GHz and 15 GHz.

* * * * *

UNITED STATES PATENT AND TRADEMARK OFFICE
CERTIFICATE OF CORRECTION

PATENT NO.       : 8,639,378 B2
APPLICATION NO. : 12/920022
DATED            : January 28, 2014
INVENTOR(S)      : Krapf et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 740 days.

Signed and Sealed this
Twenty-second Day of September, 2015

Michelle K. Lee
*Director of the United States Patent and Trademark Office*